P. H. K. KALNIN.
FISH SCALER.
APPLICATION FILED DEC. 1, 1910.
1,008,473.
Patented Nov. 14, 1911.
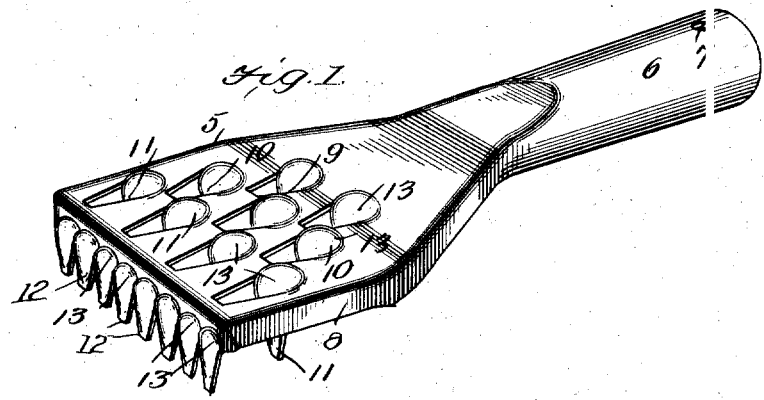
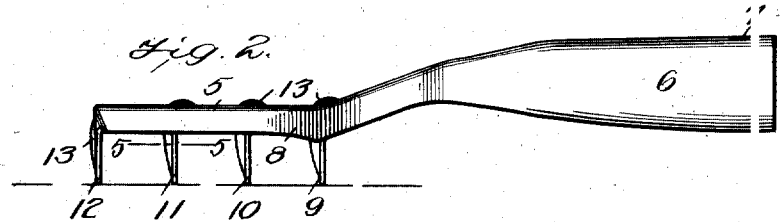
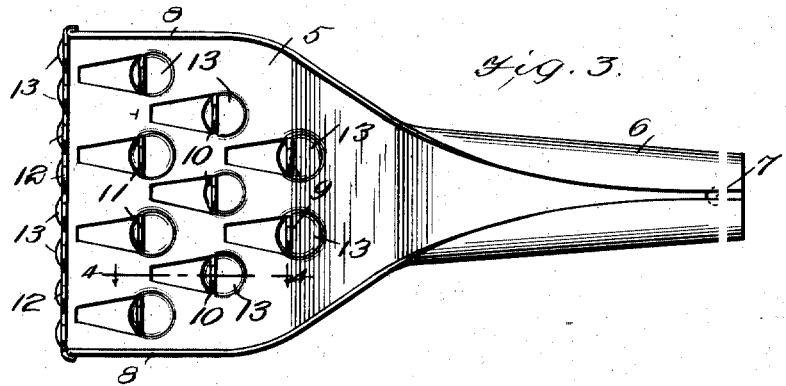
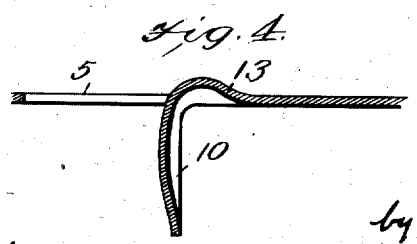
Witnesses
F. C. Barry
A. R. Walton
Inventor
PAUL HAROLD K. KALNIN
by
Attorneys

UNITED STATES PATENT OFFICE.

PAUL HAROLD K. KALNIN, OF DORCHESTER, MASSACHUSETTS.

FISH-SCALER.

1,008,473.  Specification of Letters Patent.  Patented Nov. 14, 1911.

Application filed December 1, 1910. Serial No. 595,167.

*To all whom it may concern:*

Be it known that I, PAUL HAROLD K. KALNIN, subject of the Czar of Russia, residing at Dorchester, in the county of Suffolk and State of Massachusetts, have invented certain new and useful Improvements in Fish-Scalers, of which the following is a specification.

This invention relates to devices for removing scales from fish, and it has for its object to provide a device of this kind which enables the scales to be easily and quickly removed, and also one which is strong and durable, and simple in construction.

The invention is illustrated in the accompanying drawing, forming a part of this specification, in which drawing, Figure 1 is a perspective view of the device; Fig. 2 is a side elevation thereof; Fig. 3 is a bottom plan view; Fig. 4 is a section on the line 4—4 of Fig. 3, and Fig. 5 is a section on the line 5—5 of Fig. 2.

The device is constructed of a single piece of sheet metal, and it comprises a head 5 armed with teeth, and provided with a handle 6, the latter being formed by reducing the width of the sheet of metal at one end, and then rolling said reduced portion into substantially cylindrical form. The rear end of the handle has an aperture 7 to enable the device to be conveniently hung on a nail or other similar support when not in use. That part of the sheet which forms the head is left flat, and has downward bends at its side edges to form depending marginal stiffening or strengthening flanges 8. The head is also downwardly offset with respect to the handle, so that when the device is in use, the hand grasping the handle will not come in contact with the fish which is being scaled. The head 5 is provided with several spaced and parallel rows of teeth, said rows extending transversely of the head. These rows of teeth are indicated at 9, 10, 11 and 12, respectively. The row 12 is located at the extremity of the head, and is formed by bending the sheet downwardly to form a depending flange, the bottom edge of the latter being notched to form the teeth. The other rows of teeth are formed by punching tongues from the sheet, and bending said tongues downwardly. The teeth of the several rows are all of uniform length, and the extremities of the teeth are blunt so as not to cut or tear the flesh of the fish. The side edges of the teeth converge in the direction of the blunt ends, whereby a tapered or wedge-shaped tooth is produced. In order to stiffen the teeth, the material at the base thereof is swelled, as indicated at 13, and the teeth are also bent so that they assume a concavo-convex form in cross-section, as shown in Fig. 5. It will be noted that the number of teeth in the respective rows is not uniform, the row 12 having the greatest number, the next row behind the same having a smaller number of teeth, the next row a still smaller number, and so on throughout the entire series of rows. The row 12 has twice as many teeth as the row 11, and each succeeding row has one tooth less. The teeth of the row 11 are so located with respect to the teeth of the row 12, that they are in alinement with every other space between the latter, and the teeth of the row 10 are in alinement with the spaces between the teeth of the row 11, and also with the other spaces between the teeth of the row 12. The teeth of the row 9 are in line with the spaces between the teeth of the row 10, and also with the teeth of the row 11 which are in alinement with the last-mentioned spaces.

The purpose of the herein described arrangement of teeth is to facilitate the removal of the scales. The first three rows of teeth, 9, 10, and 11, are designed to loosen or tear up the scales, while the last row, 12, which has the greatest number of teeth, completes their removal. The first row serves merely to start tearing or loosening the scales, while the next succeeding rows find the scales pushed partly sidewise, thus leaving the scales easier to be torn or loosened up by the next row, and preparing the scales for the last row. Each tooth follows a new line except those of the row 9. The wedge-shaped formation of the teeth also facilitates the loosening up and removal of the scales.

I claim:

A fish scaler comprising a head armed with teeth which are wedge shaped and blunt, said teeth being arranged in rows, one row of teeth being at the front end of the head, and the teeth of said row being set closely together, the teeth of the next row being set farther apart than those of the first row and located in alinement with every other space between the teeth of said first-mentioned row, and the teeth of the row which is behind the second-mentioned row being in alinement with the spaces between the teeth of said second-mentioned row, and also in alinement with the other spaces between the teeth of the first-mentioned row.

In testimony whereof I affix my signature in presence of two witnesses.

PAUL HAROLD K. KALNIN.

Witnesses:
ELMER C. RICHARDSON,
LOUISE C. ARENTZEN.

Copies of this patent may be obtained for five cents each, by addressing the "Commissioner of Patents, Washington, D. C."